United States Patent
Iio et al.

(10) Patent No.: US 8,593,650 B2
(45) Date of Patent: Nov. 26, 2013

(54) PRINTER AND METHOD FOR DETECTING MOVEMENT OF OBJECT

(75) Inventors: Akihisa Iio, Yokohama (JP); Yohei Nakamura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 956 days.

(21) Appl. No.: 12/695,939

(22) Filed: Jan. 28, 2010

(65) Prior Publication Data

US 2010/0195129 A1    Aug. 5, 2010

(30) Foreign Application Priority Data

Feb. 2, 2009   (JP) .................. 2009-021557

(51) Int. Cl.
*G06F 15/00*       (2006.01)
(52) U.S. Cl.
USPC ......... 358/1.12; 358/1.18; 358/474; 358/450; 358/540
(58) Field of Classification Search
USPC ....................................... 358/1.12
See application file for complete search history.

(56) References Cited

U.S. PATENT DOCUMENTS

| | | | |
|---|---|---|---|
| 7,104,710 B2 | 9/2006 | Otsuka | |
| 2005/0013647 A1 | 1/2005 | Claramunt | |
| 2006/0038891 A1* | 2/2006 | Okutomi et al. | 348/222.1 |
| 2006/0262341 A1* | 11/2006 | Matsuda | 358/1.14 |
| 2009/0086229 A1* | 4/2009 | Hyuga et al. | 358/1.9 |
| 2009/0290202 A1* | 11/2009 | Mizushima et al. | 359/3 |

FOREIGN PATENT DOCUMENTS

JP    2007-217176 A    8/2007

* cited by examiner

*Primary Examiner* — Twyler Haskins
*Assistant Examiner* — Brendan McCommas
(74) *Attorney, Agent, or Firm* — Canon U.S.A., Inc. IP Division

(57) ABSTRACT

A printer includes an optical sensor configured to image a surface of a medium, and a contact member configured to provide a unique concavo-convex shape by contacting the surface of the conveyed medium on an upstream side thereof. A calculation unit calculates the movement amount of the medium by pattern matching calculation using a correlation window between a plurality of image data acquired at different timings by an optical sensor with the conveyance of the medium. The calculation unit searches in image data first acquired for a unique pattern reflecting the unique concavo-convex shape, and set a region including the unique pattern as a correlation window.

17 Claims, 10 Drawing Sheets

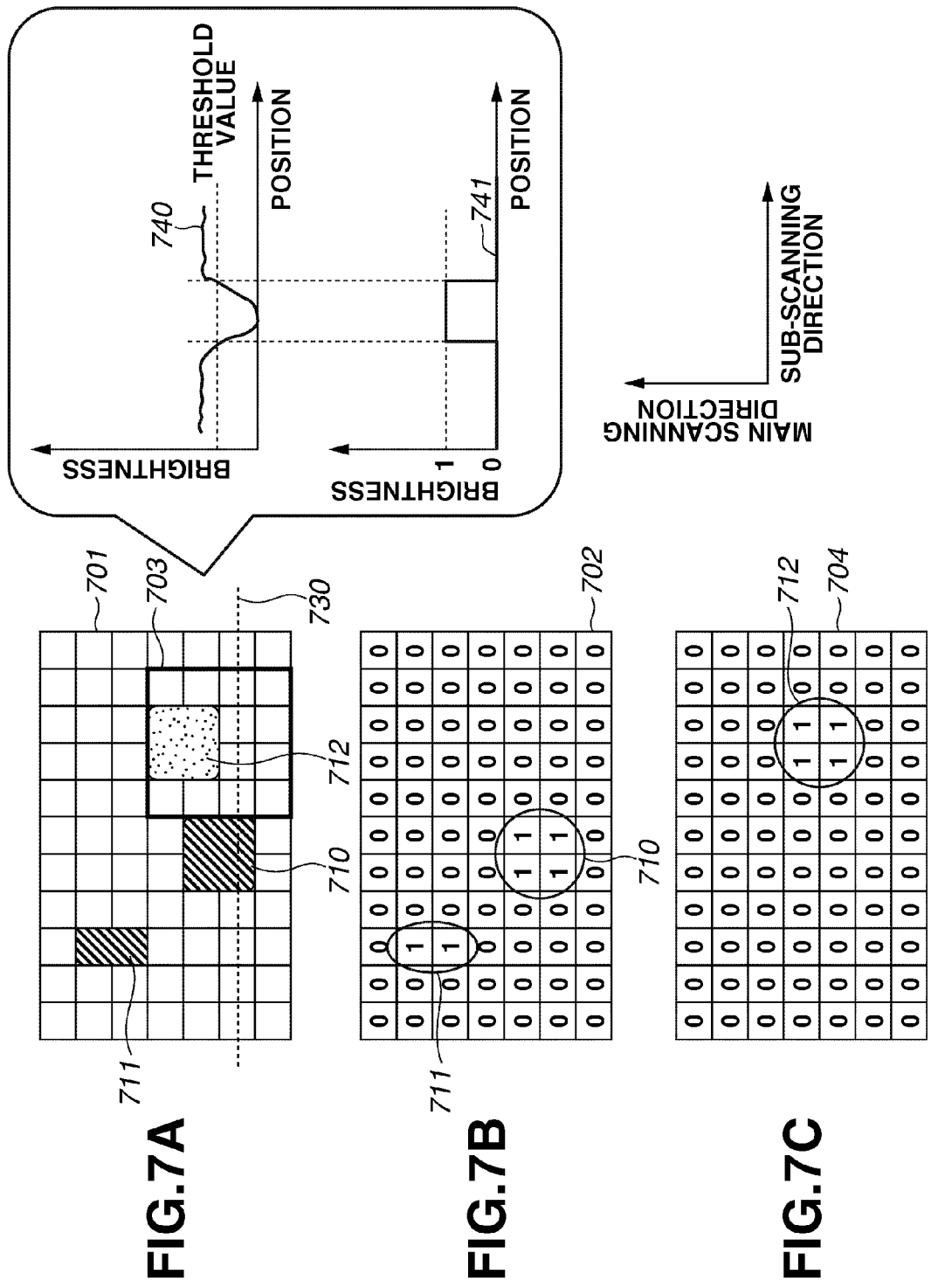

PRINTER AND METHOD FOR DETECTING MOVEMENT OF OBJECT

BACKGROUND OF THE INVENTION

1. Field of the Invention

The present invention relates to a method for detecting the movement of an object by image processing, and a printer using the method.

2. Description of the Related Art

In printing while conveying media such as print sheets, if conveyance accuracy is low, density non-uniformity of a halftone image occurs, or a magnification error occurs. Therefore, the quality of an obtained print image is degraded.

Therefore, a printer includes a precise conveying mechanism using high-accuracy components. However, demands for higher printing quality are increased, so that further improvements in accuracy are desired. On the other hand, demands for cost are also increased. Thus, both the increase in accuracy and the reduction in cost are required.

In order to cope with this, attempts to image a surface of the medium and detect the movement of the conveyed medium by image processing have been made to detect the movement of the medium with high accuracy and realize stable conveyance by feedback control.

Japanese Patent Application Laid-Open No. 2007-217176 discusses a technique for imaging a surface of a moving medium more than once in time series at different timings by an image sensor, comparing obtained images by pattern matching processing, and detecting the movement amount of the medium.

In order to image the surface of the medium and detect the movement of the medium by image processing, it is required that a fine concavo-convex shape on the surface of the medium is sufficiently optically identifiable and a unique image pattern is clear.

When the surface of the medium to be used is significantly smooth, however, an image obtained by the imaging has a low contrast. Therefore, a unique pattern in the image may be difficult to identify. Thus, the accuracy of the pattern identification processing is degraded or the processing cannot be performed. This phenomenon will be described below.

FIG. 8 illustrates an example of images obtained by imaging a partial region of a surface of a moving medium at different timings. An image 101 is first captured, and an image 102 is captured after the medium moves by a predetermined distance. In both images, a fine concavo-convex shape on the surface of the medium (unevenness of paper fibers, etc.) appears as unique patterns having a high contrast.

It is determined where the same pattern as a partial region 101a indicated by a broken line in the image 101 exists in the image 102 based on the degree of similarity between the images by known pattern matching processing. The result of the determination shows that the pattern exists in a region 102a indicated by a broken line in the image 102. The movement amount 103 of the medium can be determined by detecting how many pixels are there between the regions 101a and 102a in a conveyance direction.

FIG. 9 illustrates an example of images 201 and 202 in a case where a medium whose surface has a concavo-convex shape smoother than that in FIG. 8. In the images, there are a fewer unique patterns formed by the concavo-convex shape on the surface of the medium than those in FIG. 8.

In the example of the image 201, a region 201a used for pattern matching processing includes no unique pattern. When an image pattern similar to the region 201a is searched for in the image 202, it is determined that a plurality of regions 203 are similar to the region 201a. Therefore, the movement amount of the medium cannot be accurately detected.

FIG. 10 illustrates examples of images 301 and 302 in a case where a medium whose surface has a concavo-convex shape smoother than that in FIG. 8. In the images, unique patterns are seen but have a significantly lower contrast than those in FIG. 8. If the contrast of the image is significantly low, information relating to the unique patterns greatly changes by only a slight change in the quantity of illumination light, for example.

A region 301a and a region 302a after movement may be actually recognized as different patterns by a variation in the quantity of illumination light before and after the movement, although they are originally the same unique pattern. Then, a matching cannot be detected by pattern matching processing. Therefore, the movement amount of the medium cannot be accurately detected.

SUMMARY OF THE INVENTION

The present invention is directed to a printer and a method for detecting the movement of an object, which can cope with various types of media and enable image formation with a good quality by detecting the movement amount of the medium with high accuracy and reliably.

According to an aspect of the present invention, a printer includes a print unit configured to perform printing on a medium, an optical sensor configured to image a surface of the medium and acquire image data, a contact member configured to provide a unique concavo-convex shape optically identifiable by contacting the surface of the medium conveyed on an upstream side in a conveyance direction of an imaging position by the optical sensor, and a calculation unit configured to calculate a movement amount of the medium by pattern matching processing using a correlation window between a plurality of image data acquired at different timings by the optical sensor with the conveyance of the medium, wherein the calculation unit searches in one of the image data for a unique pattern reflecting the unique concavo-convex shape, and sets a region including the unique pattern as the correlation window.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A, 7B, and 7C illustrate a concept of a search for a unique pattern by object recognition according to a third exemplary embodiment.

DESCRIPTION OF THE EMBODIMENTS

Various exemplary embodiments, features, and aspects of the invention will be described in detail below with reference to the drawings. The components illustrated in exemplary embodiments are only examples and it is in no way intended to limit the invention, its application, or uses.

A range in which the present invention is applied spreads over a movement detection field required to detect the movement of an object with high accuracy, starting with a printer. The present invention is applicable to apparatuses such as a printer and a scanner and apparatuses used in an industrial field, a physical distribution field, and so on, which convey an object and give the object various types of processing such as inspection, reading, working, and marking.

When applied to the printer, the present invention is applicable to printers of various types such as an inkjet printer, an electrophotographic printer, a thermal printer, and a dot impact printer. In the present specification, media mean sheet-shaped or plate-shaped media such as paper, a plastic sheet, a film, a glass, ceramic, and resin.

Figure 1:
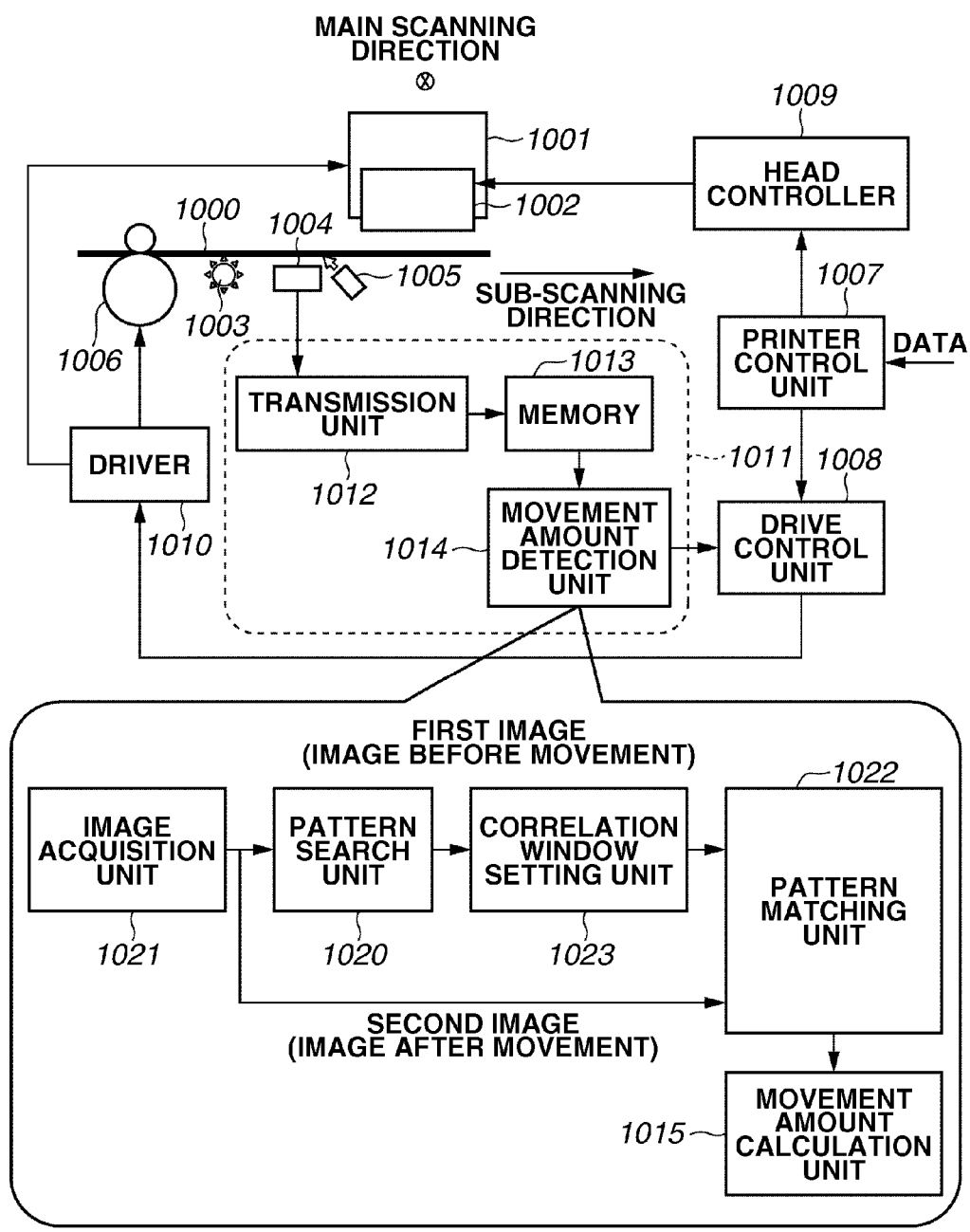
FIG. 1 is a block diagram illustrating a system configuration of an inkjet printer according to a first exemplary embodiment.

FIG. 1 is a block diagram illustrating a system configuration of an inkjet printer according to a first exemplary embodiment. The printer according to the present exemplary embodiment is a so-called serial printer that alternately performs reciprocating movement of a print head (main scanning) and a predetermined amount of step feeding of a medium (sub-scanning) to form a two-dimensional image.

The present invention is not limited to the serial printer. The present invention is also applicable to a so-called line printer that includes a full line print head covering a print width and forms a two-dimensional image by the movement of a medium relative to the fixed full line print head. The procedure for printing is as follows.

A conveyance roller 1006 conveys a medium 1000 to a print position opposing to a print head 1002 along a conveyance path. At the print position, a carriage 1001 carrying the print head 1002 discharges ink toward a print surface of the medium 1000 to print one line while performing reciprocating motion in a main scanning direction (a direction perpendicular to a sheet surface of FIG. 1).

This is alternated with step feeding corresponding to one line in a sub-scanning direction of the medium 1000 by the conveyance roller 1006 for printing. A discharge roller discharges the printed medium 1000. A printer control unit 1007 instructs a drive control unit 1008 to move the carriage 1001 and convey the medium 1000.

The drive control unit 1008 sends a drive pulse to a driver 1010, and drives the driver 1010 to move the carriage 1001 and convey the medium 1000 by the rotation of the conveyance roller 1006.

The printer control unit 1007 sends discharge data to a head controller 1009, and controls the driving of the head controller 1009, to discharge ink from a nozzle of the print head 1002.

The line printer has no moving carriage 1001 but a fixed long line print head 1002, and performs printing by discharging ink simultaneously from nozzles of the print head 1002 in synchronization with the conveyance of a medium.

In a media conveyance path during printing, a contact member 1003 serving as a rotating member in the shape of a rotatable spur is provided between the conveyance roller 1006 and the print position, and on the side opposite to the print side of the medium 1000. The contact member 1003 contacts a surface of the medium 1000 and provides a unique concavo-convex shape, which is optically identifiable, to the medium 1000.

The contact member 1003 differs from a spur arranged in the vicinity of the discharge roller used for discharging the medium 1000, and positively provides a physical concavo-convex shape on the surface of the medium 1000. The contact member 1003 is a driven rotating member that is driven by the movement of the medium 1000 to rotate in contact with the medium 1000.

The contact member 1003 has a toothed rotator, in the shape of a roulette used in sewing, having a plurality of teeth each having a sharp tip formed in its circumference. The sharp tips of the teeth of the toothed rotator are brought into contact with the surface of the medium 1000, to provide a concavo-convex shape, including concavo-convex-shaped portions equally spaced at a predetermined pitch in a continuous perforated shape, which is so fine that it is difficult to view on the surface of the medium 1000.

In the media conveyance path during printing, a sensor unit including an optical sensor 1004 and a light source 1005 is provided between the contact member 1003 and the print position, and on the side opposite to the print side of the medium 1000. The sensor unit images the surface of the medium 1000 to acquire image data.

The contact member 1003 is positioned on the upstream side of an imaging position by the optical sensor 1004 in a media conveyance direction (a direction in which a moving object moves), to provide the concavo-convex shape on the surface of the medium 1000. The optical sensor 1004 images the surface of the medium 1000 after the concavo-convex shape is provided thereon.

The optical sensor 1004 images the surface of the medium 1000 illuminated from the side by the light source 1005 more than once in time series at predetermined different timings, to acquire a plurality of image data. The predetermined timings are, for example, two timings before and after the conveyance by the step feeding corresponding to one line of the medium 1000.

The optical sensor 1004 contains a two-dimensional image sensor and a lens, and has resolution, imaging sensitivity, and an imaging range sufficient to optically recognize the concavo-convex shape on the medium 1000 formed by the contact member 1003. An imaging signal in the optical sensor 1004 is sent to a signal processing unit 1011 serving as a calculation unit for calculating the movement amount of the medium 1000.

The signal processing unit 1011 includes a transmission unit 1012 including an analog-to-digital (A/D) converter, a memory 1013, and a movement amount detection unit 1014. The imaging signal is stored as digital image data in the memory 1013 via the transmission unit 1012.

The movement amount detection unit 1014 calculates the movement amount of the medium 1000 by image processing including correlation calculation processing based on a plurality of image data acquired in time series at different timings and stored in the memory 1013. Information relating to the calculated movement amount is sent to the drive control unit 1008 for feedback control.

The drive control unit 1008 adds the information relating to the movement amount to a drive instruction signal from the printer control unit 1007 and sends a drive pulse for driving the conveyance roller 1006 to a driver 1010, to carry out feedback control. The driving of the conveyance roller 1006 may be controlled, after inputting an output value of an encoder for detecting the rotation of the conveyance roller 1006 to the drive control unit 1008 and further adding the output value of the encoder to the drive instruction signal.

The details of the movement amount detection unit 1014 will be described next. The movement amount detection unit 1014 is a processing circuit mainly composed of a processor, and is divided into functional blocks such as an image acquisition unit 1021, a pattern search unit 1020, a correlation window setting unit 1023, a pattern matching unit 1022, and a movement amount calculation unit 1015.

The image acquisition unit 1021 acquires, out of the plurality of image data stored in the memory 1013, the necessary image data. The image acquisition unit 1021 sends first image data before the movement of the medium 1000 to the pattern search unit 1020 in each of continuous steps of the step feeding of the medium 1000, and sends second image data after the movement of the medium 1000 by one step to the pattern matching unit 1022.

The pattern search unit 1020 searches in the first image data for a unique pattern (a light-dark pattern) reflecting a unique concavo-convex shape provided by the contact member 1003.

The correlation window setting unit 1023 sets a rectangular correlation window in a region including the unique pattern searched for in the first image data. Image data corresponding to the set correlation window is referred to as a template, and a position of the correlation window in the image data is referred to as a template position.

The pattern matching unit 1022 performs pattern matching processing by correlation calculation processing using a template corresponding to the correlation window set in the first image data acquired at a timing (before the movement of the medium) and second image data acquired in time series at a timing different therefrom (after the movement of the medium). The pattern matching processing causes a template position, with which data representing the template set in the first image data is matched, to be detected in the second image data.

The movement amount calculation unit 1015 calculates, based on respective template positions in the first image data and the second image data, the movement amount of the medium 1000 therebetween from a difference between the positions in the media conveyance direction.

The pattern matching processing means a method for detecting an image position where a particular image pattern exists from image data by correlation calculation between the image data. A known processing method called Area-Based matching (window matching) is used for the correlation calculation.

As a specific processing method, algorithms such as Sum of Absolute Difference (SAD), Sum of Squared Difference (SSD), Normalized Cross-Correlation (NCC), and Phase-Only Correlation (POC) have been known, and any one of the algorithms is used. A sub-pixel order position may be detected by interpolation processing such as parabola fitting from a calculated correlation value.

Next, a procedure for detecting the movement amount of a medium by imaging will be described with reference to a flowchart of FIG. 2.

In step S01, at a timing before movement in the step feeding corresponding to one line in the sub-scanning direction of the medium, the optical sensor 1004 images a part of a surface of the medium to acquire first image data and store the first image data in the memory 1013. The first image data includes the unique pattern reflecting the unique concavo-convex shape provided by the contact member 1003.

The image acquisition unit 1021 acquires the first image data from the memory 1013, and sends the acquired first image data to the pattern search unit 1020.

In step S02, the pattern search unit 1020 searches in the first image data for the unique pattern reflecting the unique concavo-convex shape provided by the contact member 1003. The details of a method for searching for the unique pattern will be described below.

In step S03, the correlation window setting unit 1023 sets a correlation window in a region including the unique pattern searched for in the first image data based on the results of the search. The set correlation window is in a rectangular shape of size with predetermined margins (e.g., respective two pixels on the left, right, top, and bottom) around the unique pattern detected by the search. The size of the correlation window need not necessarily be variable.

Each size of the unique concavo-convex shape provided by the contact member 1003 is almost the same. Therefore, the size of the unique pattern reflecting the unique concavo-convex shape does not greatly vary. Thus, the size of the correlation window may be not a variable size but a fixed size previously empirically found.

The correlation window setting unit 1023 sets the correlation window for the first image data as a template, as described above, and sends, together with the template, a template position to the pattern matching unit 1022.

In step S04, the medium is step-fed by a predetermined amount corresponding to one line next to the above-mentioned processing. Between the processing in step S01 and S03, processing in step S04 may be performed.

In step S05, after step-feeding the medium corresponding to one line (at a timing different from a timing at which the first image data is acquired), the optical sensor 1004 images apart of the surface of the medium to acquire second image data, and stores the acquired second image data in the memory 1013. The second image data also includes a unique pattern reflecting a unique concavo-convex shape provided by the contact member 1003, similarly to the first image data.

The image acquisition unit 1021 acquires the second image data from the memory 1013, and sends the acquired second image data to the pattern matching unit 1022.

In step S06, the pattern matching unit 1022 performs pattern matching processing by using the above-mentioned algorithm for correlation calculation using the template corresponding to the correlation window set in the first image before the movement of the medium and the second image data after the movement of the medium. The pattern matching processing causes a template position, with which data representing the template set in the first image data is matched, to be detected in the second image data.

When searching for the template position in the second image data, with which the template is matched, the template position needs not be searched for over all regions of the second image data. The movement amount corresponding to one line of the medium is predetermined. A position in the first image data is spaced by the movement amount toward the downstream side on the second image data.

Therefore, a range in which pattern matching is performed in the second image data may be limited to the vicinity of a position that is shifted by the movement amount of the medium corresponding to one line toward the downstream side from the template position in the first image data. Thereby, the processing time can be reduced.

In step S07, the movement amount calculation unit 1015 obtains a difference in the media conveyance direction between respective template positions in the first image data and the second image data (a difference in the number of pixels included in the two-dimensional image sensor in the optical sensor). The difference in the number of pixels and the distance on the medium per pixel are multiplied to calculate the movement amount of the medium in the step feeding corresponding to one line. A movement speed can be also obtained if the movement amount is divided by a period of time required for the movement.

Figure 3:
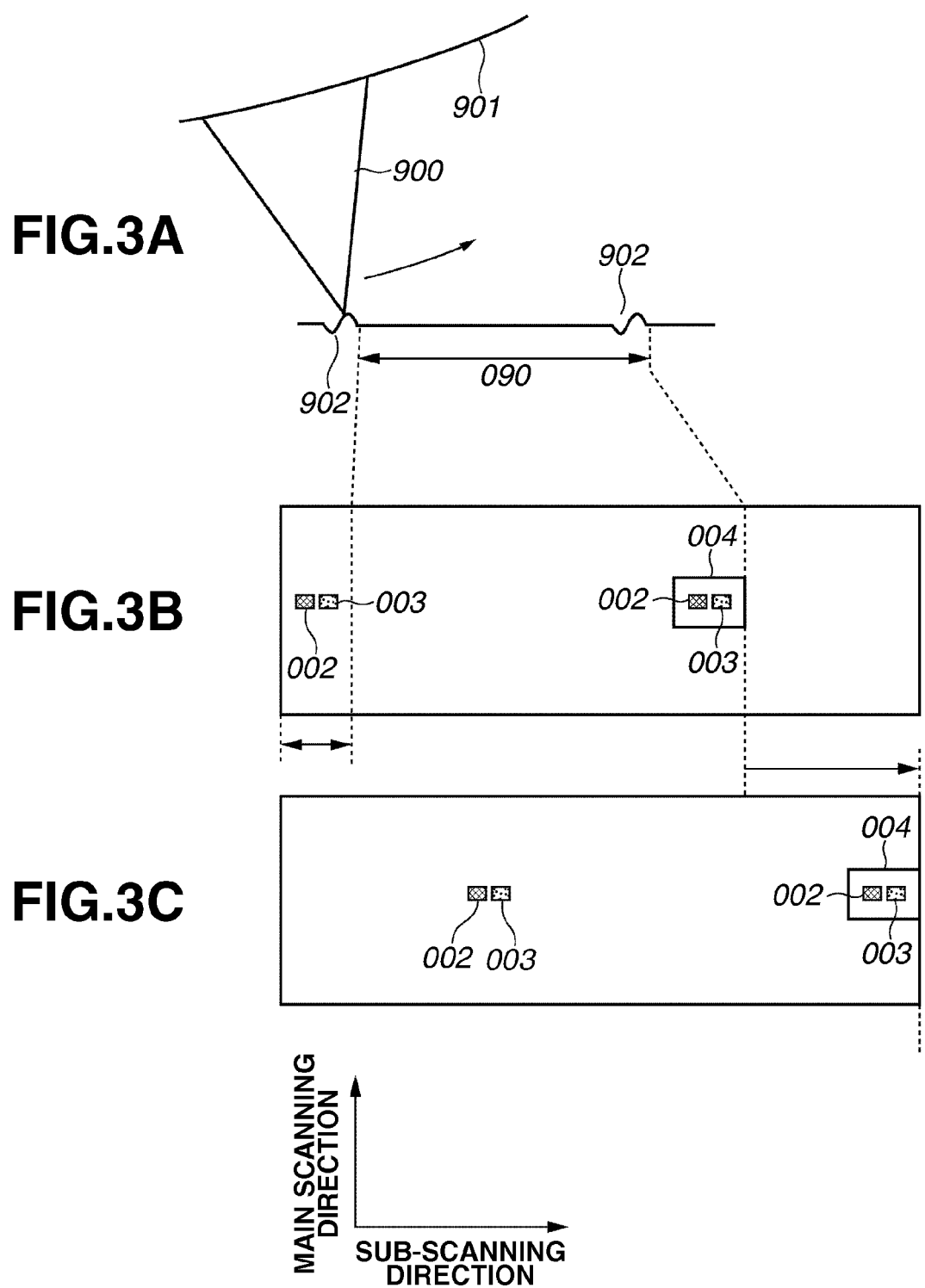
FIGS. 3A, 3B, and 3C illustrate a state of a concavo-convex shape provided on a medium by a contact member and a unique pattern in an image reflecting the concavo-convex shape.

FIGS. 3A to 3C are schematic views illustrating the state of a concavo-convex shape provided on a medium by the contact member 1003 and a unique pattern in an image reflecting the concavo-convex shape. In FIG. 3A, a sharp tip of a tooth 900 is pierced into a surface of the medium while a toothed rotator 901 of the contact member 1003 is driven by the movement of the medium 1000 to rotate counterclockwise so that a plurality of concavo-convex-shaped portions 902 are provided at a predetermined pitch 090 in a movement direction.

FIGS. 3B and 3C respectively illustrate an example of image data acquired by the optical sensor 1004 by imaging the surface of the medium provided with the plurality of concavo-convex-shaped portions 902. FIG. 3B illustrates first image data before movement, and FIG. 3C illustrates second image data after movement corresponding to one line.

A unique pattern including a light portion 003 and a dark portion 002 is a unique image pattern reflecting the unique concavo-convex-shaped portion 902 provided on the surface of the medium by the contact member 1003. A rectangular correlation window 004 is set in a range including one unique pattern, to acquire a template (image data) in the correlation window 004.

A range of imaging by the optical sensor 1004 requires a length that is equal to or more than a pitch 090 of a concavo-convex shape plus the size of the correlation window 004 in the media conveyance direction (sub-scanning direction), more preferably a length that is equal to the length of the pitch 090 plus a distance at which accuracy is to be ensured. If such conditions are satisfied, the distance at which accuracy is to be ensured can be detected by one sensor whichever position the correlation window 004 is set.

It may not only a single two-dimensional image sensor but also a plurality of two-dimensional image sensors that constitutes the optical sensor 1004. For example, dimensions are as follows:
  the size of the medium read by one of pixels composing the two-dimensional image sensor: 10 μm square
  the pitch of the concavo-convex shape provided on the medium by the toothed rotator: 5 mm (corresponding to 500 pixels)
  the conveyance amount of the medium by the step feeding corresponding to one line: 3 mm (corresponding to 300 pixels)
  the size of the correlation window 004 in a conveyance direction: corresponding to 10 pixels (100 μm on the medium)
In this case, the number of pixels in the conveyance direction of the two-dimensional image sensor requires 500+300+10=810 pixels (8.1 mm on the medium).

In this example, the pitch of the concavo-convex shape provided by the toothed rotator is longer than the conveyance amount of the medium in the step feeding. Thus, the distance between unique patterns is long. In this case, the position where the correlation window 004 is to be set greatly changes for each print. The unique pattern must be searched for in the image data obtained by the imaging, to set the correlation window 004 at the position of the unique pattern.

An example of a method for searching for a unique pattern in the pattern search unit 1020 will be described below. The simplest method is a method for searching in image data obtained by imaging for a pair of a pixel set whose brightness is low relative to ambient brightness (referred to as a dark portion) and a pixel set whose brightness is high relative to ambient brightness (referred to as a light portion).

Generally, a unique pattern reflecting a concavo-convex shape has a higher contrast than a smooth surface of a medium around the unique pattern. This increases the possibility that pixels composing the unique pattern in the whole image include both a light portion and a dark portion.

More specifically, the each brightness of pixels are first compared within a dark portion search range previously set, to detect a portion relatively darker than the surrounding region (a set of relatively darkest pixels), the darkest portion in this example. If a pixel set having similar darkness is detected in a plurality of portions, their respective positions are stored as dark portion candidates.

A light portion search range is then set in the vicinity of the detected dark portion. The positional relationship between the dark portion and the light portion is roughly determined. Therefore, the light portion search range may be smaller than the dark portion search range. If there are a plurality of dark portion candidates, the light portion search range is set at each of the positions.

The each brightness of the pixels are compared in the set light portion search range, to detect a portion relatively lighter than the surrounding region (a set of relatively lightest pixels), the lightest portion in this example.

If a light portion candidate is detected in one portion, the portion is determined as a unique pattern. If a pair of a dark portion and a light portion is detected in a plurality of portions, the portion where a difference in contrast between the dark portion and the light portion is the greatest is determined as a unique pattern.

The above-mentioned correlation window is set in a range surrounding the determined unique pattern to acquire a template. In the above-mentioned procedure, the order in which the dark portion and the light portion are detected may be reversed.

Figure 4:
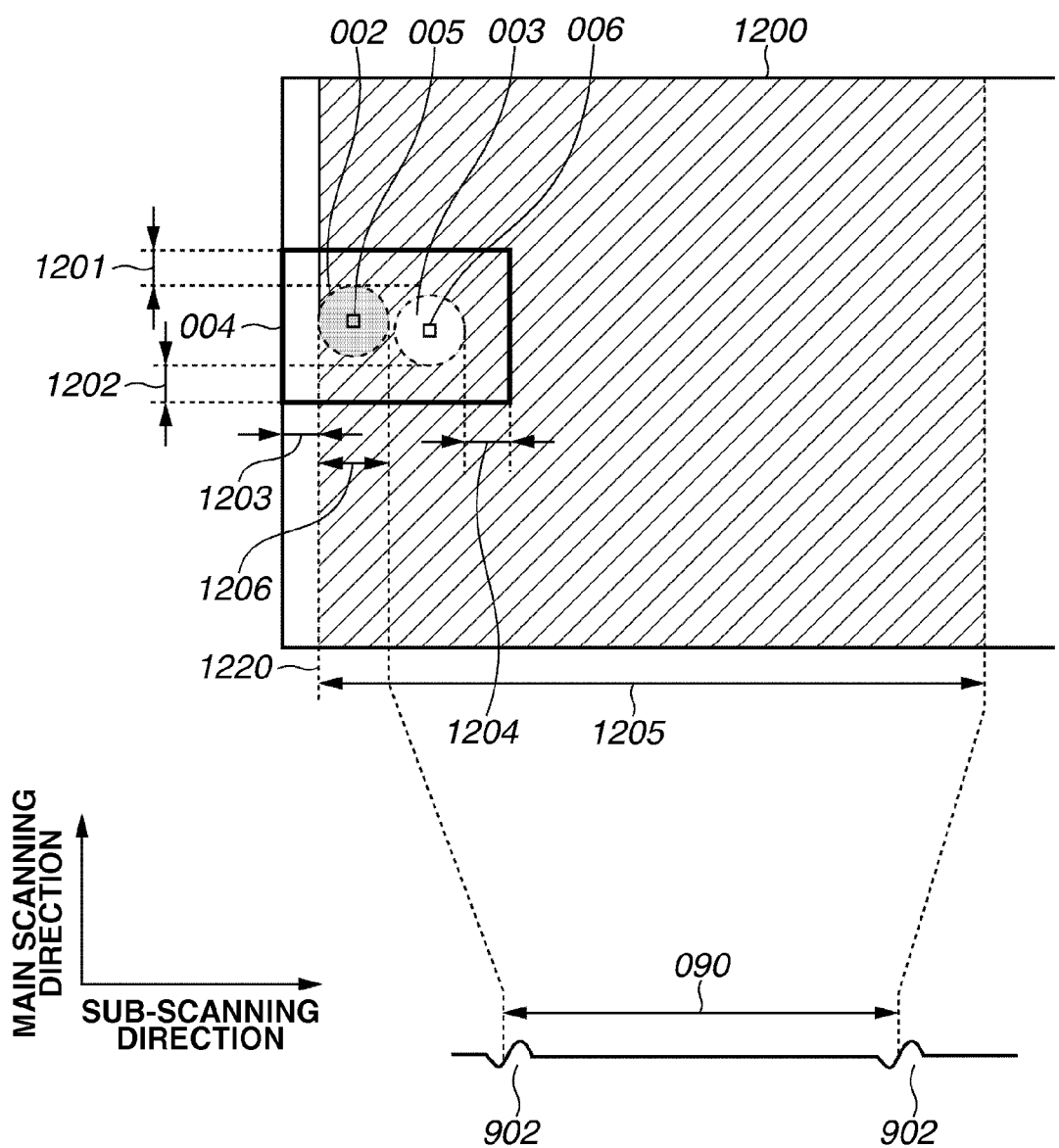
FIG. 4 illustrates a method for setting a correlation window including a dark portion and a light portion.

FIG. 4 illustrates a method for setting a correlation window 004 including a dark portion 002 and a light portion 003. The dark portion 002 is searched for in a rectangular search region 1200 indicated by oblique hatching. A darkest portion 005 (one pixel) is searched for in the search region 1200, to set the dark portion 002 of a predetermined predicted size centered around the darkest portion 005.

A lightest portion 006 (one pixel) is searched for in a limited range relatively shifted with the darkest portion 005 as a reference, to set the light portion 003 of a predetermined predicted size centered around the lightest portion 006. A limited range for searching for the lightest portion 006 will be described below.

In this example, both the predicted size of the dark portion 002 and the predicted size of the light portion 003 are in the shape of a circle with a radius of five pixels. A rectangular region surrounding the set dark portion 002 and light portion 003 is set as the correlation window 004. In this case, the dark or light portion may be a pixel set slightly greater than predicted. Therefore, in anticipation of the increase, a rectangular region respectively having five pixels added thereto as predetermined margins on the left, right, top, and bottom (1201 on the top, 1202 on the bottom, 1203 on the left, and 1204 on the right) of a range including the dark portion 002 and the light portion 003 is set as the correlation window 004.

If the distance between the darkest portion 005 and the lightest portion 006 is 15 pixels in the sub-scanning direction and three pixels in the main scanning direction as a result of the search, the size of the correlation window 004 (a rectangle enclosed by a thick line) including the dark portion and the light portion is 35 pixels by 23 pixels.

Ideally, the medium only moves in the sub-scanning direction when conveyed. Actually, the medium may be slightly shifted in the main scanning direction perpendicular to the sub-scanning direction during the conveyance. This is a phenomenon called skew.

The distance between the light portion and the dark portion is three pixels in the main scanning direction due to the effect of the skew. A radius of five pixels and a margin of five pixels in this example are just an example. The present invention is not limited to these. Both the radius and the margin may be set by empirically finding numerical values in which a concavo-convex shape formed by sharp tips of the teeth of the toothed rotator of the contact member 1003 falls.

The meaning of a dark portion search region 1200 will be described. A search start position 1220 in the sub-scanning direction of a dark portion is the sixth pixel from an end of image data (the upper stream side in the sub-scanning direction), considering a margin of five pixels. A search range 1205 directed toward the downstream side in the sub-scanning direction from the search start portion 1220 varies according to a pitch 090 of a concavo-convex shape (predetermined pitch) provided on the medium by the toothed rotator of the contact member 1003.

More specifically, a region that is equal to the sum (corresponding to 510 pixels) of the pitch 090 of the concavo-convex shape (corresponding to 500 pixels) and a predicted size 1206 of the dark portion (corresponding to ten pixels) may be set as a search range. The reason why the search range in the sub-scanning direction is limited to this region is as follows.

If the dark portion search range 1200 also includes further the downstream side of the search range 1200, a unique pattern detected on the downstream side cannot be detected on second image data because it is beyond an imaging region of the two-dimensional image sensor in the optical sensor after the movement corresponding to one line of the medium. In the rectangular search region 1200, the dark portion is searched for as described above.

Figure 5:
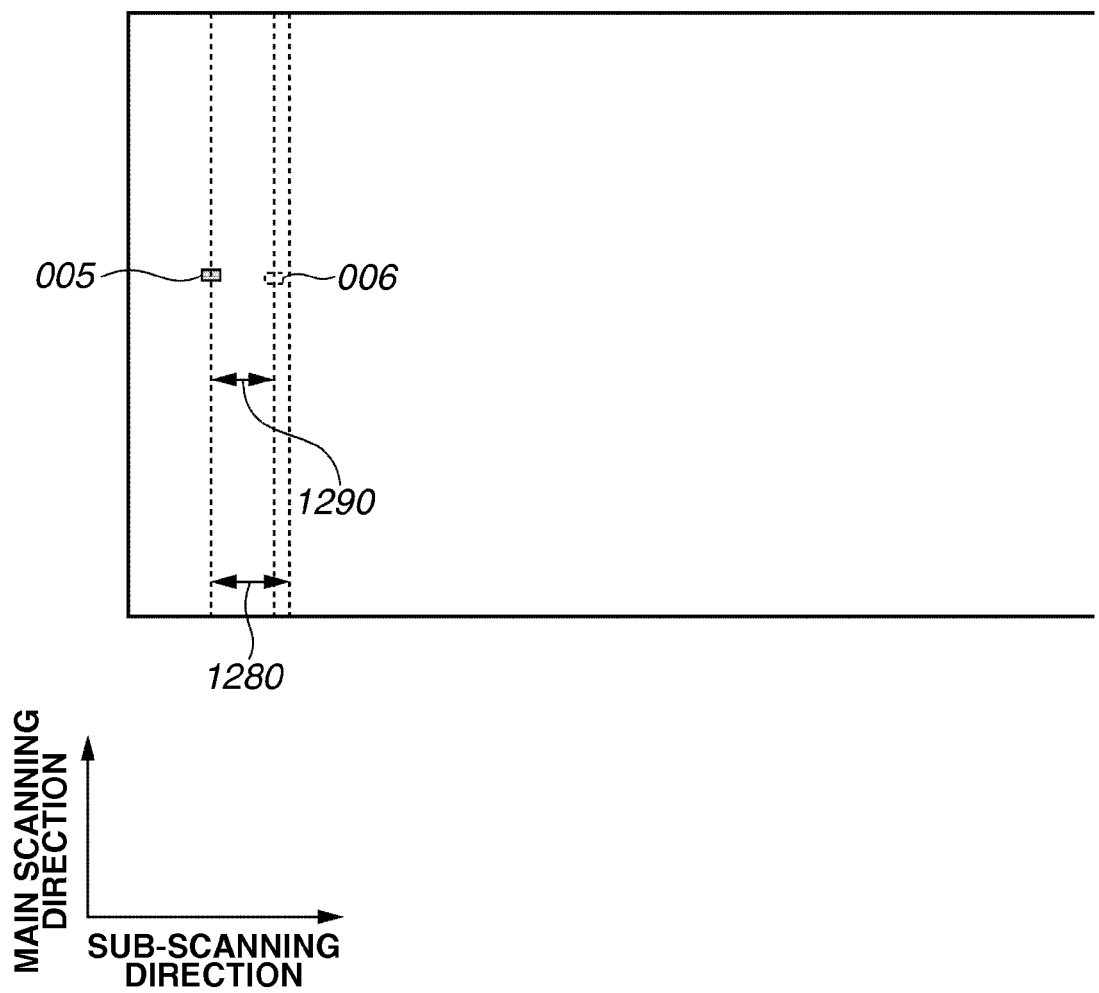
FIG. 5 illustrates a light portion search range.

FIG. 5 is a schematic view illustrating a light portion search range subsequent to a dark portion search range. A light portion search range 1280 in the sub-scanning direction is set as a predetermined range relatively shifted in the sub-scanning direction with a detected darkest portion 005 as a reference. If there are a plurality of darkest portions, the search range is set with each of the darkest portions as a reference.

The light portion search range 1280 may be set as a value that is equal to a predicted distance 1290 (15 pixels) between the dark portion and the light portion plus a predetermined number of pixels (e.g., five pixels) set including anticipation of a variation, for example. Since the positional relationship of a pair of the dark portion and the light portion is roughly determined, the light portion search range may be thus significantly smaller than the dark portion search range, resulting in a shortened period of time for processing.

Although the case where the pair of the dark portion and the light portion is searched for to detect the position of the unique pattern has been described, processing may be simplified by searching for either one of the dark portion and the light portion to detect the position of the unique pattern. In other words, the position of the unique pattern may be detected using at least one of the dark portion and the light portion.

According to the above-mentioned first exemplary embodiment, the optically recognizable concavo-convex shape is newly provided on the surface of the medium, and the image data obtained by the imaging has a high contrast because it has the unique pattern at each position. In addition, the unique pattern is searched for to set the correlation window. Therefore, the concavo-convex shape can be reliably perceived and utilized.

As a result, even when the smooth medium is used, highly precise and reliable pattern matching processing can be performed. More specifically, there can be provided a printer that can cope with various types of media and can detect the movement of the medium with high accuracy to enable image formation with a good quality. Furthermore, there can be provided a method that can deal with various types of objects and can detect the movement amount of the object with high accuracy and reliably.

Not only the movement amount of the medium but also the other movement information can be calculated. For example, the speed can be obtained from the movement amount per unit time. Alternatively, the acceleration can also be obtained by calculating a change in the speed by differential processing.

Furthermore, when the position with which the correlation window is matched is searched for in the second image data, not only the downstream side but also the upstream side can be set as a search range. This enables the movement direction and the movement amount to be detected even when the medium moves toward the upstream side. This is true for other exemplary embodiments, described below.

A second exemplary embodiment will be described below. The whole configuration of a printer is similar to that illustrated in FIG. 1 and hence, the overlapped description is not repeated. The procedure for processing is similar to that in the first exemplary embodiment except for a processing method in step S02 illustrated in FIG. 2.

A concavo-convex shape on a medium provided by sharp tips of teeth 900 of a contact member 1003 may be roughly a predetermined shape. Therefore, a unique pattern reflecting the concavo-convex shape may be roughly a determined patter. In the second exemplary embodiment, the unique pattern is previously acquired empirically and stored as a fixed template in a memory. By correlation calculation for pattern matching processing using the fixed template, a similar position is found on first image data, and a correlation window is set at the position.

The subsequent processing is similar to that in the first exemplary embodiment. More specifically, in order to set the position of the correlation window, the pair of the dark portion and the light portion is searched for in the first exemplary embodiment, while the unique pattern is searched for using the fixed template in the second exemplary embodiment. This processing is performed in a pattern search unit 1020.

Figure 6A:
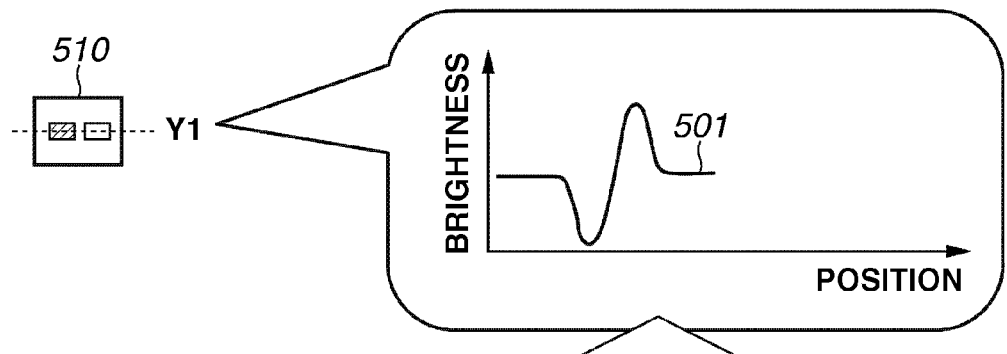
FIGS. 6A and 6B illustrate a concept of pattern matching processing using a fixed template according to a second exemplary embodiment.
Figure 6B:
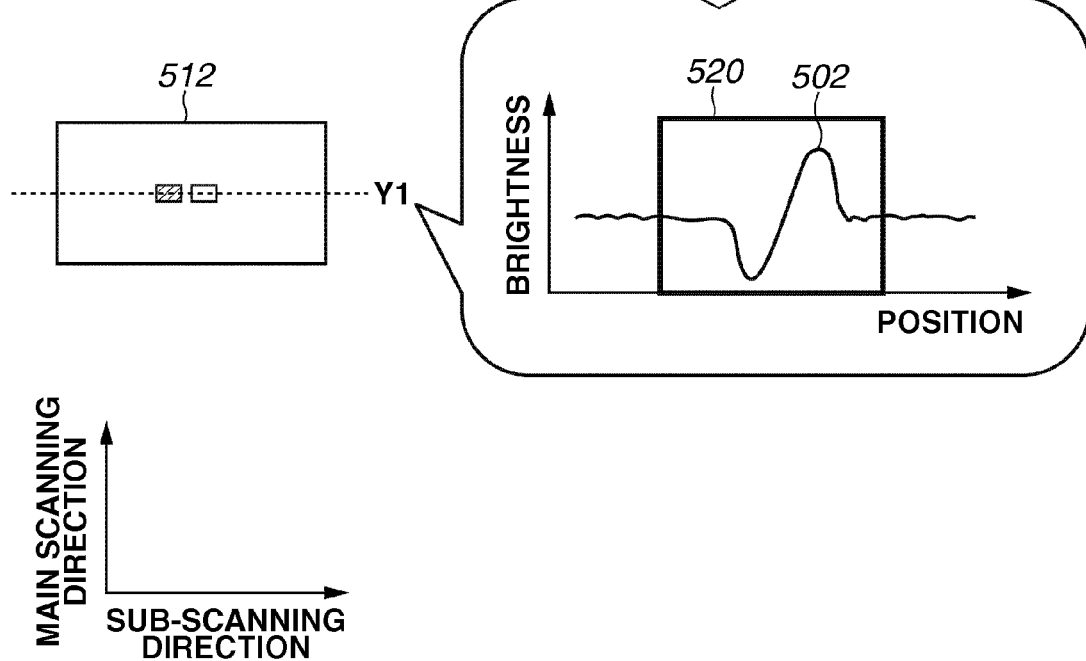
Figure 8:
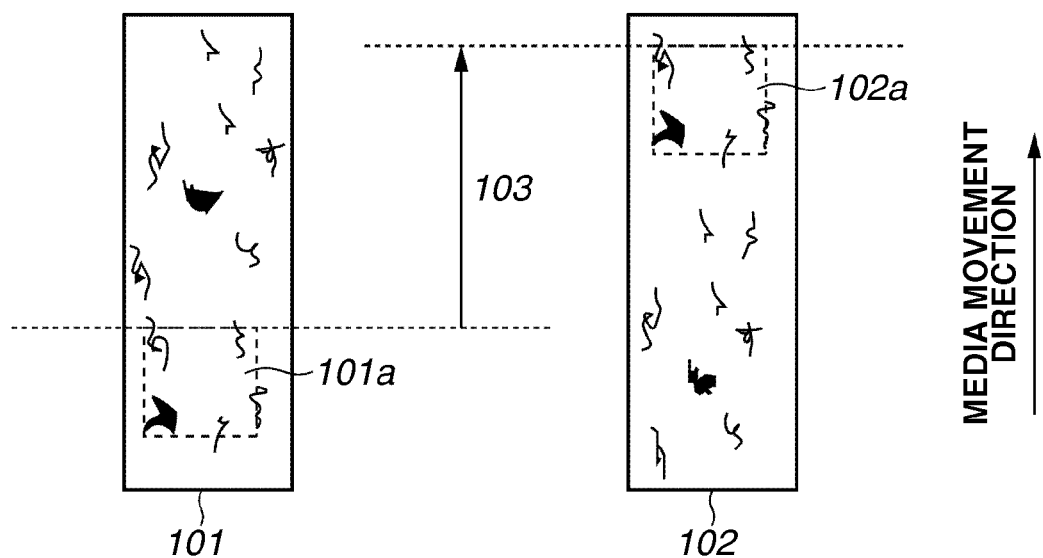
FIG. 8 illustrates an example of images captured at different timings.
Figure 9:
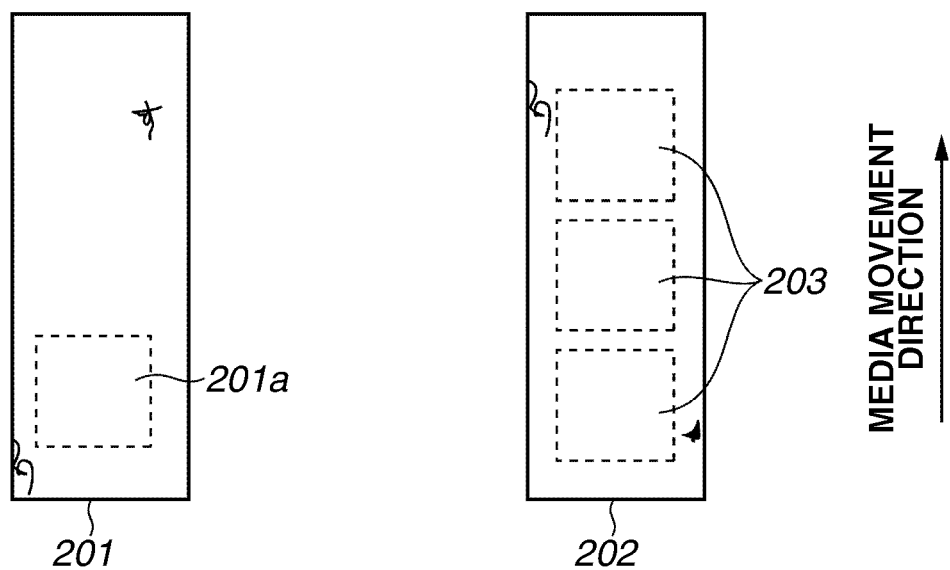
FIG. 9 illustrates an example of images in which there are a few unique patterns.
Figure 10:
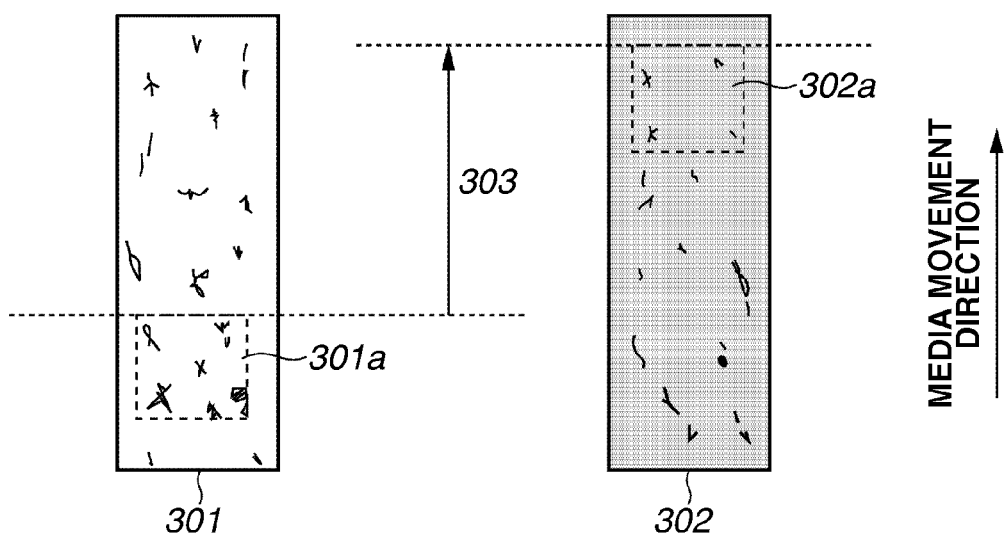
FIG. 10 illustrates an example of images in which unique patterns have a low contrast.

FIGS. 6A and 6B are schematic views illustrating the concept of pattern matching processing using a fixed template. In FIG. 6A, a waveform 501 in a graph represents one-dimensional array data included in a two-dimensional fixed template 510. In the graph, the horizontal axis represents a position in a sub-scanning direction and the vertical axis represents brightness (a data value).

FIG. 6B illustrates the state in which the pattern matching is performed using the fixed template 510 in first image data 512. Although only a one-dimensional array is extracted for easy understanding, two-dimensional processing is actually performed.

The fixed temperature 510 previously empirically obtains a unique image pattern based on a concavo-convex shape formed on the medium and stores the found unique image pattern, and performs correlation calculation between the fixed template 510 and the first image data 512, to detect positions between which there is a high similarity. Area-Based matching (window matching) is used, as in the above-mentioned first exemplary embodiment, for the correlation calculation.

Conceptually, a waveform similar to the waveform 501 illustrated in FIG. 6A is detected from waveforms illustrated in FIG. 6B. If it is determined that a waveform 502, for example, is similar to the waveform. 501, a correlation window 520 is set at the position of the waveform 502. The size of the correlation window 520 may be equal to or different from the size of the fixed template 510.

A search width in the sub-scanning direction in the first image data 512 is a value that is equal to a pitch of the concavo-convex shape provided on the medium by a toothed rotator of the contact member 1003 plus the size in the sub-scanning direction of the fixed template 510. A search start position is on the upper-stream side in the sub-scanning direction.

Figure 2:
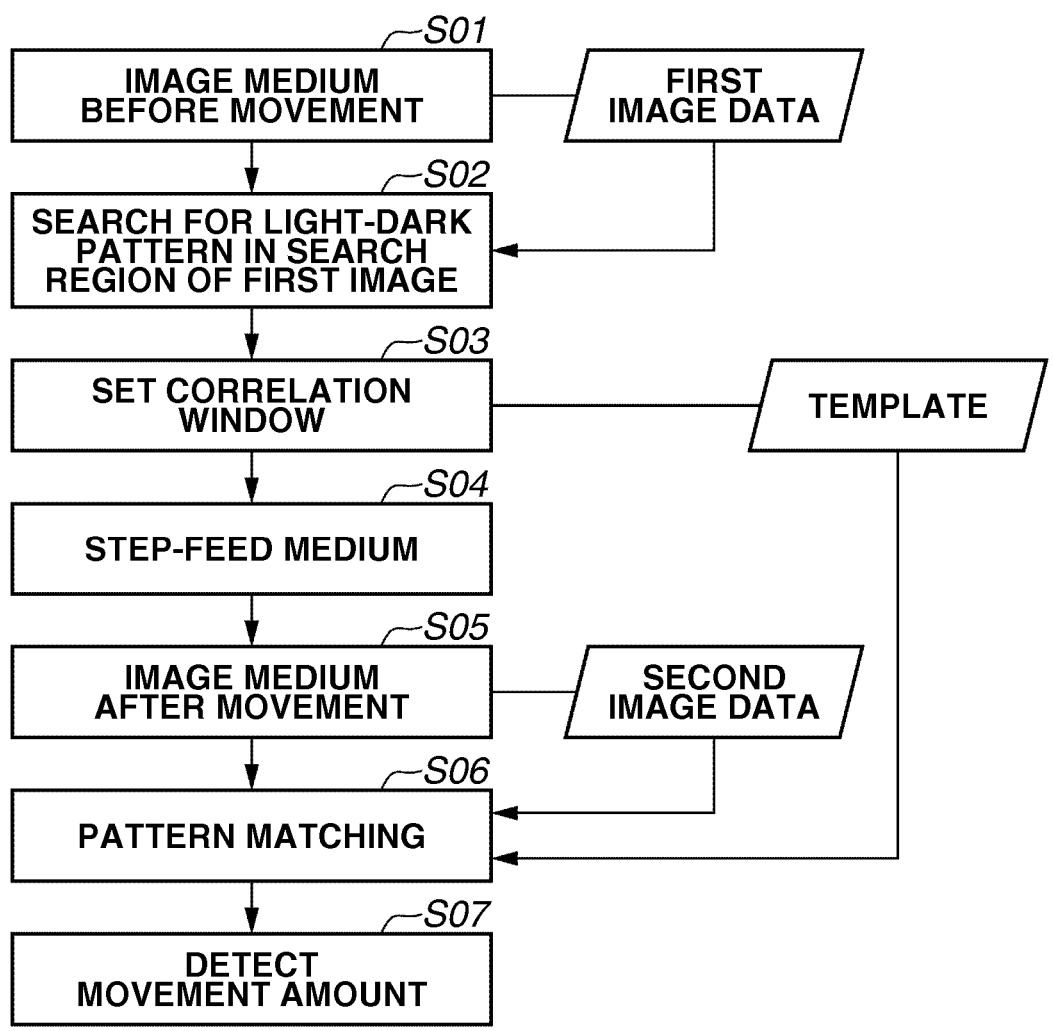
FIG. 2 is a flowchart illustrating a procedure for detecting the movement amount of a medium according to the first exemplary embodiment.

If the search is thus performed by the pattern search unit 1020, and the correlation window 520 is set by a correlation window setting unit 1023, the subsequent processing is similar to that in step S03 and the subsequent steps in the flowchart of FIG. 2.

According to the second exemplary embodiment, even if there are contamination and scratches on the medium other than the concavo-convex shape provided by the contact member, the possibility of erroneous recognition in setting the correlation window can be further reduced in addition to the function and the effect in the first exemplary embodiment.

A third exemplary embodiment will be described below. The whole configuration of a printer is similar to that illustrated in FIG. 1 and hence, the overlapped description thereof is not repeated. The procedure for processing is similar to that in the first exemplary embodiment except for a processing method in step S02 illustrated in FIG. 2.

In the third exemplary embodiment, a pattern search unit 1020 searches for a pair of a dark portion and a light portion using a method for object recognition of an image. FIGS. 7A to 7C are schematic views illustrating the concept of a search for a unique pattern by the object recognition.

In FIG. 7A, an image 701 is a part of a search range in first image data. Although the search range is limited to seven pixels by eleven pixels for easy understanding, the search range is actually a region identical to the search region 1200 illustrated in FIG. 4.

A dark portion is recognized based on a predetermined dark threshold value in the image 701. The dark threshold value may be 10 when the gray level of each pixel is 256 (0 to 255), for example. Out of pixels composing the image 701, the pixel having brightness equal to or larger than a dark threshold value 10 (dark pixel) and the other pixel are respectively represented by 1 and 0 in binary representation. One-dimensional data 740 on a Y position 730 is converted into binary data 741, for example, when binarized. FIG. 7B illustrates a binary image 702 obtained by thus binarizing the image 701 using the dark threshold value.

Then, out of pixels composing the binary image 702, a set (object) of the pixels having a pixel value 1 (dark pixels) is then identified by the object recognition. In an example of the binary image 702, two objects 710 and 711 are identified. An algorithm for object recognition performs labeling of a binary image to recognize the binary image as a mass of dark portions.

Labeling means adding a label (a number) to connected pixels having the same pixel value to add a group attribute to each group of the pixels. In the above-mentioned example, a group attribute is added to a set (object) of the connected pixels having the pixel value 1.

Out of the plurality of objects 710 and 711 thus detected, the object satisfying predetermined conditions (in this example, the number of pixels composing the object is three or more and five or less) is selected as a dark portion. The object 710 (four pixels) is determined as a dark portion because it satisfies the predetermined conditions.

In the image 701, a light portion search range is set in a region where there is a high possibility that the light portion is present in the vicinity of the recognized dark portion (object 710). In the example illustrated in FIG. 7A, a search is performed in a light portion search range 703 enclosed by a thick line. Since the positional relationship of a pair of a dark portion and a light portion is roughly predetermined. Therefore, as for the light portion, the search range may be previously limited one determined based on anticipation of the positional relationship, to shorten a period of time for processing.

The light portion is recognized based on a predetermined light threshold value in the set light portion search range 703. The light threshold value may be set to be 200 when the gray level of each pixel is 256, for example. Out of pixels composing the search range 703, the pixel having brightness that is equal to or larger than a light threshold value (200) (light pixel) and the other pixel are respectively represented by 1 and 0 in binary representation. FIG. 7C illustrates a binary image 704 thus generated by binarization.

Then, out of pixels composing the binary image 704, a set (object) of the pixels having a pixel value 1 (light pixels) is identified by similar object recognition to the above. As a result, an object 712 is identified. It is determined whether the identified object 712 satisfies predetermined conditions (in this example, the number of pixels composing the object is three or more and five or less). The object 712 is determined to be a light portion if it satisfies the predetermined conditions.

The object 712 (four pixels) is determined as a light portion because it satisfies the predetermined conditions. Thus, a pair of the dark portion and the light portion is determined as a unique pattern. A correlation window is set to include the determined unique pattern.

Suitable values are previously set, respectively, from the average value, the maximum value, and the minimum value of the brightness of image data, as the dark threshold value and the light threshold value. The color and the reflectance of a surface of a medium to be used differ according to the medium. Therefore, a suitable threshold value may differ according to the type of the medium. Therefore, different threshold values corresponding to the medium to be used are stored as a data table. The threshold value can be read out of the data table and set when used.

If the first image data is acquired, the binary image may be repeatedly generated while changing the dark threshold value and the light threshold value one at a time, to search for threshold values at which a binary image in which a suitable number of (one to two) objects can be identified is obtained, and set the threshold values as the dark threshold value and the light threshold value.

Although in the third exemplary embodiment, the pair of the dark portion and the light portion is searched for by the object recognition to detect the position of the unique pattern, the position of the unique pattern may be detected by either one of the dark portion and the light portion to simplify the processing. More specifically, the position of the unique pattern may be detected using at least one of the dark portion and the light portion.

If the search is thus performed by the object recognition in the pattern search unit 1020, and the correlation window is set by the correlation window setting unit 1023, the subsequent processing is similar to that in step S03 and the subsequent steps in the flowchart of FIG. 2.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-021557 filed Feb. 2, 2009, which is hereby incorporated by reference herein in its entirety.

What is claimed is:

1. A printer comprising:
   a print unit configured to perform printing on a medium;
   an optical sensor configured to image a surface of the medium and acquire image data;
   a contact member configured to provide a unique concavo-convex shape optically identifiable by contacting the surface of the medium conveyed on an upstream side in a conveyance direction of an imaging position by the optical sensor; and
   a calculation unit configured to calculate a movement amount of the medium by pattern matching processing using a correlation window between a plurality of image data acquired at different timings by the optical sensor with the conveyance of the medium;
   wherein the calculation unit searches in one of the image data for a unique pattern reflecting the unique concavo-convex shape, and sets a region including the unique pattern as the correlation window.

2. The printer according to claim 1, further comprising a conveyance unit configured to convey the medium; and
   a control unit configured to feed back the movement amount of the medium calculated by the calculation unit, and control the conveyance of the medium with the conveyance unit.

3. The printer according to claim 1, wherein the contact member has a toothed rotator having a plurality of teeth formed in a circumference of the rotator, and the toothed rotator rotates with the conveyance of the medium to provide the unique concavo-convex shape on the surface of the medium by the teeth.

4. The printer according to claim 1, wherein the calculation unit detects at least one of a dark portion and a light portion that form the unique pattern to perform the search.

5. The printer according to claim 1, wherein the contact member provides the unique concavo-convex shape at a predetermined pitch on the surface of the medium, and the calculation unit sets a search range in which the unique pattern is searched for according to the predetermined pitch.

6. The printer according to claim 5, wherein the search range in which the unique pattern is searched for is equal to the predetermined pitch plus a predicted size of the unique pattern.

7. The printer according to claim 1, wherein the calculation unit sets the position and the size of the correlation window to have a margin around the unique pattern, and starts the search at a position spaced by the number of pixels apart from an end of the image data acquired by the optical sensor in a media conveyance direction.

8. The printer according to claim 1, wherein the calculation unit previously stores the unique pattern as a fixed template, and performs the search using the fixed template.

9. The printer according to claim 4, wherein the calculation unit detects at least one of the dark portion and the light portion that form the unique pattern by object recognition to perform the search.

10. The printer according to claim 9, wherein the calculation unit generates a binary image by the object recognition using a threshold value, and detects the dark portion and the light portion.

11. The printer according to claim 10, wherein the threshold value is set to different values according to the medium to be used.

12. The printer according to claim 1, wherein the calculation unit performs pattern matching processing using a template of a correlation window set in first image data acquired by the optical sensor at a first timing and second image data acquired by the optical sensor at a second timing different from the first timing.

13. The printer according to claim 12, wherein the pattern matching processing is Area-Based matching.

14. The printer according to claim 13, wherein the Area-Based matching is any one of SAD, SSD, NCC, and POC.

15. The printer according to claim 1, wherein the print unit performs printing with an inkjet printing.

16. An apparatus for detecting movement of an object, comprising:
    an optical sensor configured to image a surface of an object to acquire image data;
    a contact member configured to provide a unique concavo-convex shape optically identifiable by contacting with the surface of the object moving on an upstream side in a conveyance direction of an imaging position by the optical sensor;
    a unit configured to image the surface of the moving object at different timings using the optical sensor, and acquire first image data and second image data;
    a unit configured to search in the first image data for a unique pattern reflecting the unique concavo-convex shape, and set a region including the unique pattern as a template; and
    a unit configured to search in the second image data for a region having a high correlation with the template, and calculate information relating to the movement of the object.

17. A method for detecting movement of an object, comprising:
    providing a unique concavo-convex shape optically identifiable by contacting a surface of the moving object;
    imaging the surface of the moving object at different timings to acquire first image data and second image data;
    searching in the first image data for a unique pattern reflecting the unique concavo-convex shape, and set a region including the unique pattern as a template; and searching in the second image data for a region having a high correlation with the template, and calculate information relating to the movement of the object.

* * * * *